United States Patent [19]

Bouchard

[11] Patent Number: 4,919,584

[45] Date of Patent: Apr. 24, 1990

[54] TRASH BIN VEHICLE TRANSPORTER

[76] Inventor: Roland D. Bouchard, Box 7069, Hemet, Calif. 92343

[21] Appl. No.: 222,892

[22] Filed: Jul. 22, 1988

[51] Int. Cl.[5] .............................................. B65G 67/02

[52] U.S. Cl. .................................. 414/540; 187/9 R; 414/546

[58] Field of Search ............... 414/458, 540, 541, 544, 414/545, 546, 556, 557, 921; 187/9 R, 9 E, 72, 8.43, 8.49, 8.5

[56] References Cited

U.S. PATENT DOCUMENTS

| | | | |
|---|---|---|---|
| 2,059,059 | 10/1936 | Thompson | 187/8.5 |
| 2,418,586 | 4/1947 | Jenkins | 414/540 |
| 2,732,087 | 1/1956 | Pratt | 187/9 R X |
| 2,910,203 | 10/1959 | Todd | 187/9 R |
| 3,225,868 | 12/1965 | Barnes | 187/9 R |
| 3,968,890 | 7/1976 | Robson | 414/540 |
| 4,778,327 | 10/1988 | Tufenkian et al. | 414/540 |

FOREIGN PATENT DOCUMENTS

| | | | |
|---|---|---|---|
| 2256309 | 5/1973 | Fed. Rep. of Germany | 414/623 |
| 6703389 | 8/1968 | Netherlands | 414/541 |
| 1297383 | 11/1972 | United Kingdom | 187/9 R |

*Primary Examiner*—Frank E. Werner
*Attorney, Agent, or Firm*—Edward A. Sokolski

[57] ABSTRACT

A vehicle is adapted to lift up and transport a plurality of full trash bins for transportation to another site for unloading and to transport and deposit empty clean bins to replace those removed. The vehicle is equipped with a plurality of fork lift systems which may be located along the side and the front thereof. Each of these fork lift systems has a pair of lift arms which are hydraulically raised and lowered and which are utilized to raise a trash bin off the ground so that it is held on the vehicle for transportation and to lower and deposit a replacement bin. A mechanical latching device is provided to assure that the bin will be held in the raised position, this latching device being released by a mechanical handle when the bin is to be removed from the vehicle.

3 Claims, 4 Drawing Sheets

TRASH BIN VEHICLE TRANSPORTER

This invention relates to the handling of trash bins and more particularly to a system for loading and unloading and transporting trash bins on a vehicle.

Large trash bins of the type that are used in commercial establishments and apartment houses are generally emptied into a garbage truck at their site of origin. This is a rather time consuming operation and often in the unloading, some of the trash is deposited on the street. On some occasions, hazardous waste material may be involved which could cause damage or injury with such in situ unloading.

The system of the present invention obviates the aforementioned problems by loading trash bins onto a vehicle for transportation to and unloading at the dump site. To make this operation feasible, the system of the invention employs a vehicle adapted to handle a plurality of trash bins which can be picked up and transported together to the dump site, the bins being replaced with clean empty bins.

Briefly described the system of the invention achieves the aforementioned end results by employing a plurality of fork lift systems which are arranged on the sides and rear of a vehicle. Each of these lift systems includes a pair of lift arms which may be hydraulically lifted and lowered. The bins are lifted off the ground onto the vehicle by means of the lift arms and retained on these arms for transportation to assure that these arms will not inadvertently be lowered. A mechanical latching mechanism is provided to retain the arms in the raised position, this latching mechanism being releaseable by means of an operating handle when the bins are to be unloaded from the vehicle. The spacing between the arms is adjustable to accommodate various size trash bins.

It is therefore an object of this invention to facilitate the handling of trash bins.

It is a further object of this invention to provide a transportation system for use in transporting a plurality of full trash bins to a dump site for unloading and empty bins to replace the full bins.

Other objects of the invention will become apparent as the description proceeds in connection with the accompanying drawings of which:

Referring to the Figures, vehicle 11 has a support frame 14 on which a plurality of fork lift type systems **15*a*–15*c* are mounted. These systems are generally similar in configuration and operation except that the system 15*c* which is mounted on the rear of the vehicle operates to raise its associated bin 19 upwardly in an arcuate path as indicated by arrows 20 rather than vertically as in the case of systems 15*a* and 15*b*. The systems are hydraulically operated to lift and lower the trash bins by means of separate hydraulic systems operated by levers 21*a*–21*c*** respectively.

Figure 1:
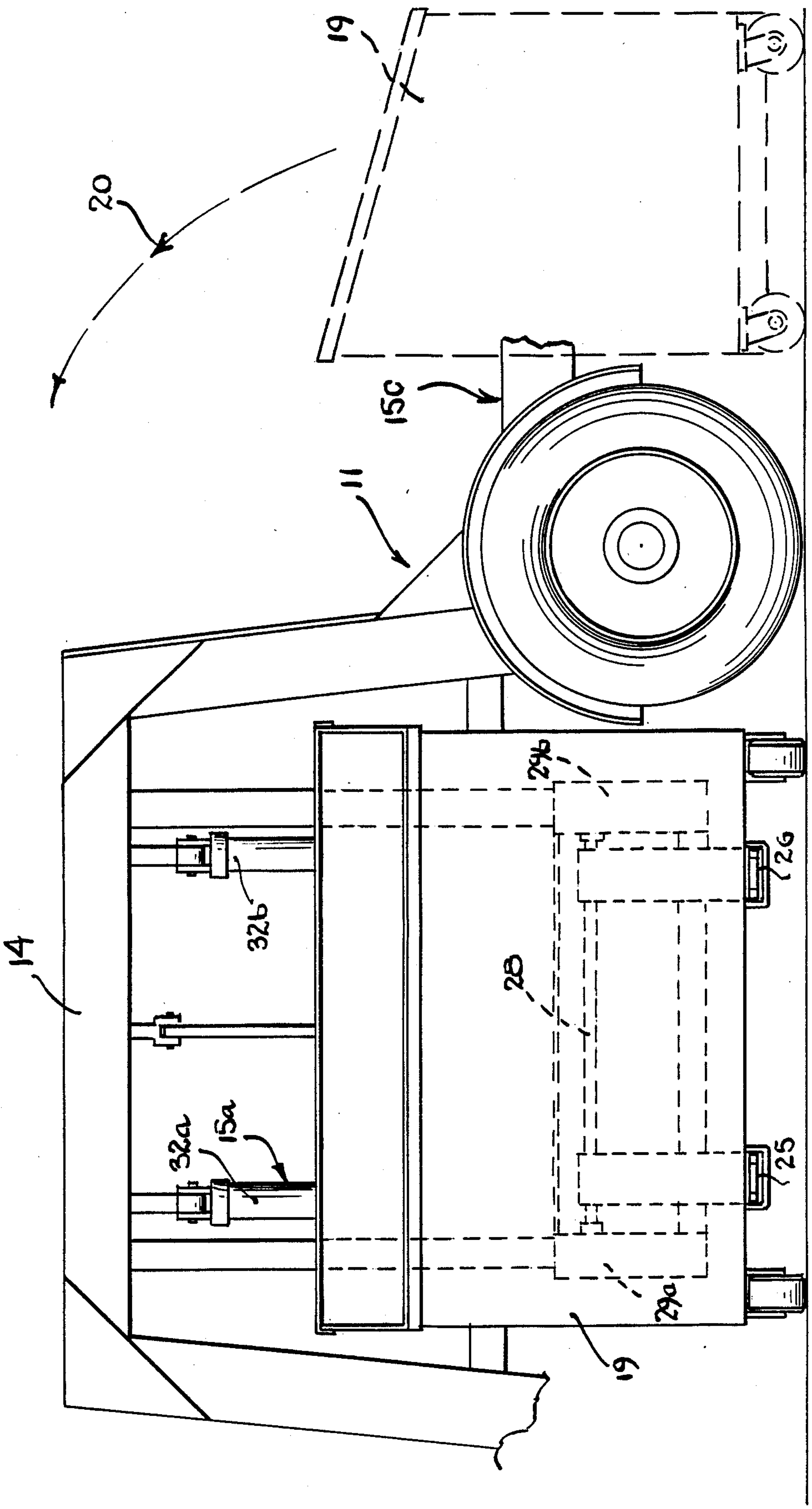
FIG. 1 is a side elevational view of a preferred embodiment of the invention.
Figure 2:
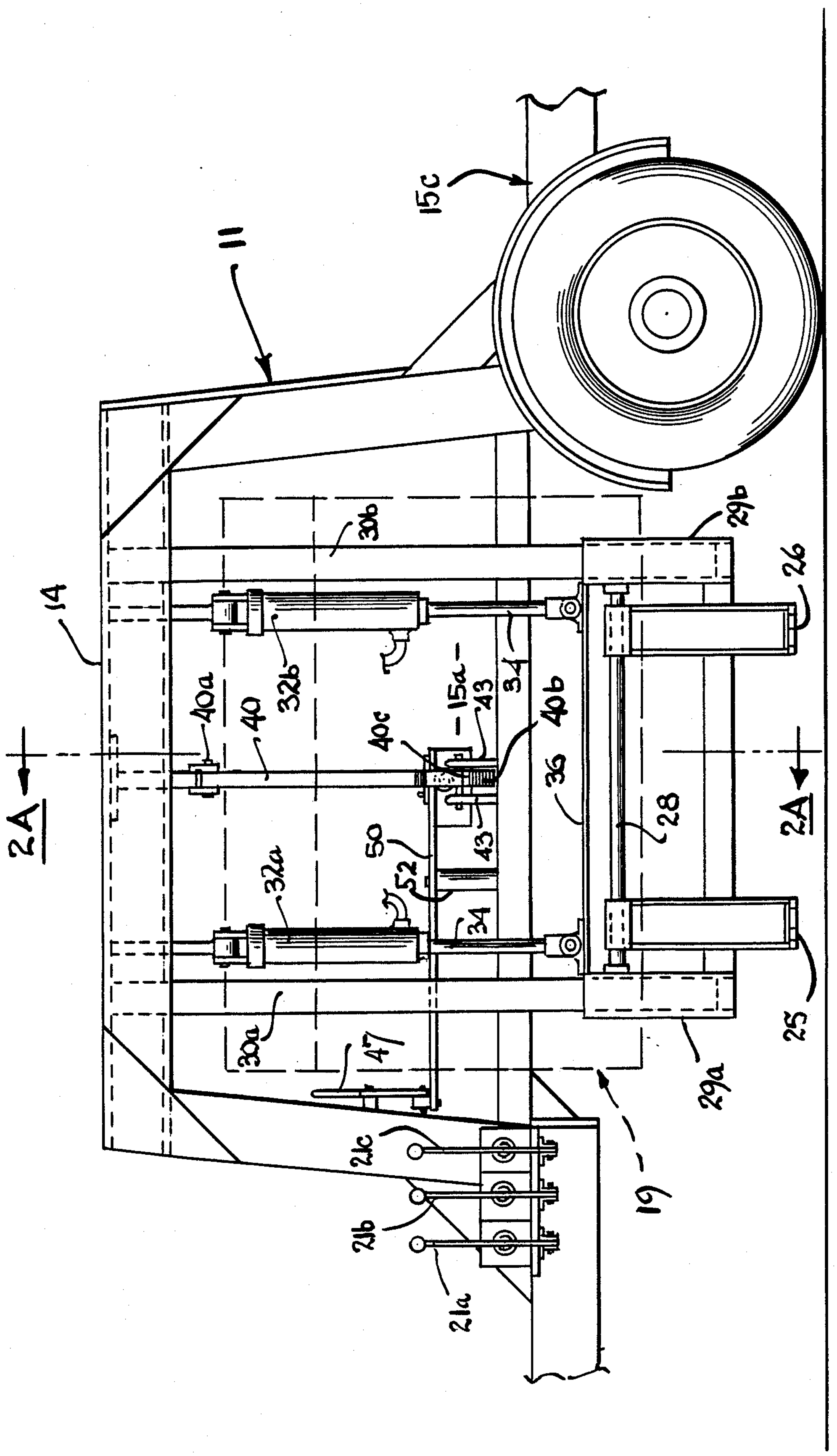
FIG. 2 is a side elevational view of one of the lifting systems of the preferred embodiment.
Figure 2A:
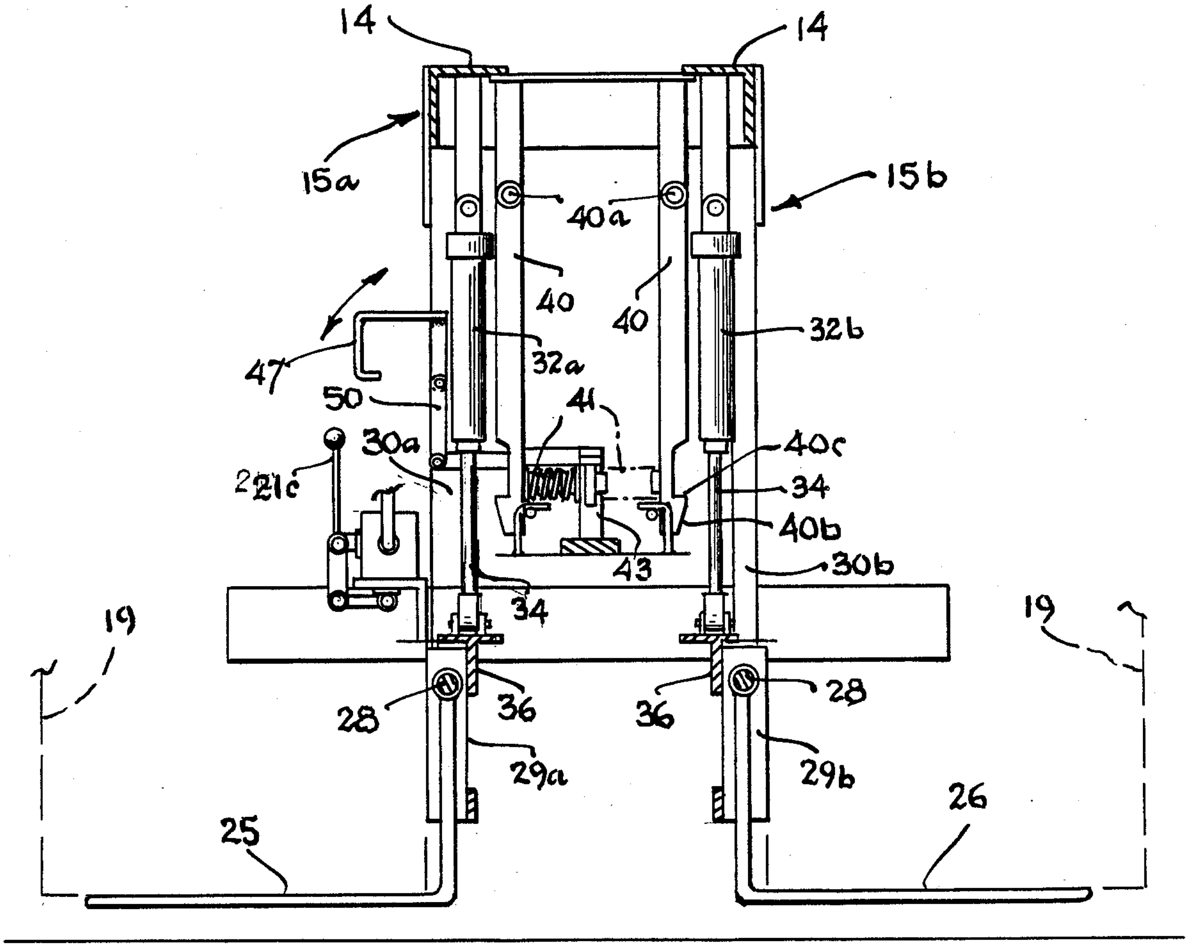
FIG. 2A is a cross sectional view taken along the plane indicated by 2A—2A in FIG. 2.
Figure 2B:
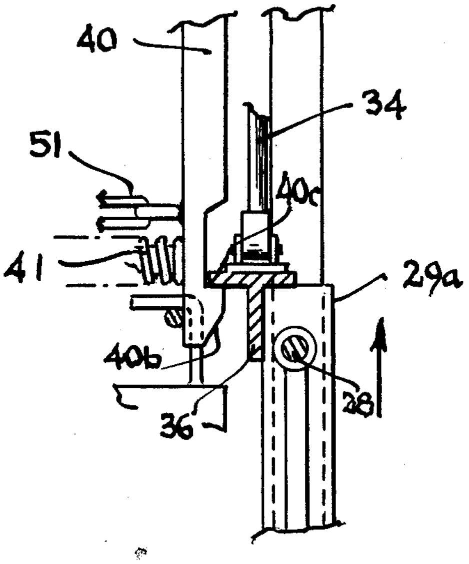
FIG. 2B is a partial sectional view illustrating the mechanical latching mechanism of the preferred embodimnt.
Figure 3:
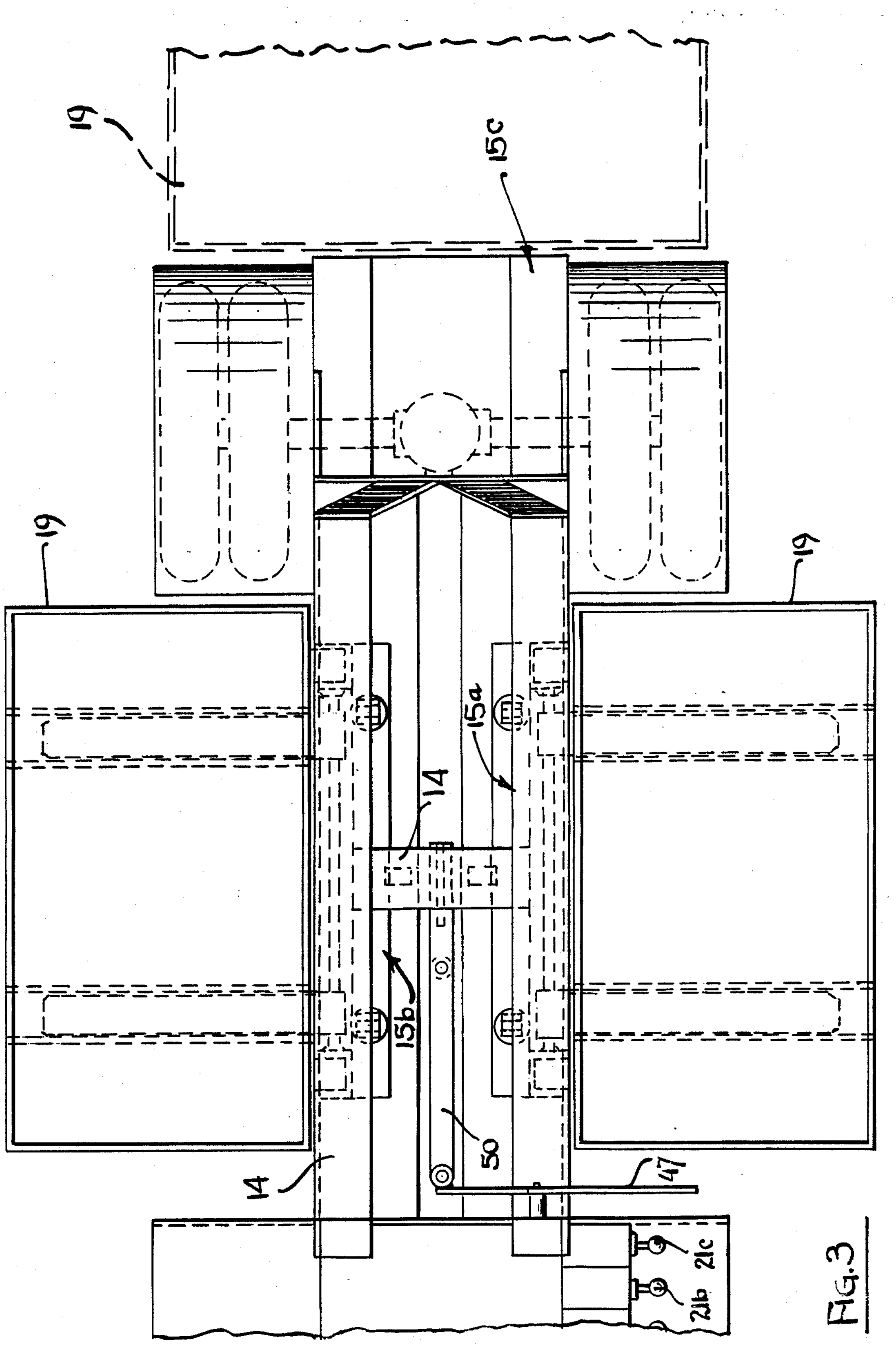
FIG. 3 is a top plan view of the preferred embodiment.

Referring now particularly to FIGS. 2, 2A and 2B, the structure and operatinn of the side lift systems will now be described. Each of such systems includes a pair of lift arms 25 and 26 as can best be seen in FIG. 2. Each pair of such arms is mounted on a cross bar 28 the spacing between the arms being adjustable by slidable movement along bar 28 and locking in position in the desired location by means of a lock bolt (not shown). Thus, the spacing between the arms can be adjusted to accommodate various sizes and types of trash bins. Cross bar 28 is fixedly supported at its opposite ends on support frames **29*a* and 29*b*. Support frames 29*a* and 29*b* are in turn slidably supported on support bars 30*a* and 30*b* which are fixedly attached to main frame 14. Drive means is provided by a pair of hydraulic cylinders 32*a* and 32*b* which are pivotally supported on main frame 14, the drive rods 34 for these cylinders being pivotally attached to bracket 36 which is in turn welded to support frames 29A and 29B** respectively.

Referring now particularly to FIGS. 2A and 2B a mechanical latching mechanism for holding lift arms in the upward position is illustrated. When hydraulic cylinders **32*a* and 32*b* are actuated to lift the pair of arms 25 and 26 (as illustrated in FIG. 2), the drive rods 34 of the paired cylinders involved are driven upwardly lifting bracket 36 and along with it the attached support frames 29*a* and 29*b*. Latching arm 40 is pivotally supported on main frame 14 at pivot point 40*a*. This arm is urged outwardly by spring 41 which abuts at one end against post member 43 and at the other end thereof against the latching arm 40. Bracket member 36 rides over cam surface 40*b* on the latching arm and finally falls into notch 40*c*, with the latching arm in latching engagement therewith as shown in FIG. 2B. In this manner the arms are mechanically latched in their raised positions to assure proper holding acting during transportation and in the event of a failure of the hydraulic system. The lift arms can be released from their latched position by means of handle 47 which when actuated drives linkage arm 50, pivotally attached to post 52 which in turn actuates chain links 51. Chain links 51 are welded to the latching arm 40 and operate to withdraw the latching arm away from bracket 36 against the spring action of springs 41**, thereby causing disengagement of the bracket from the latching arms.

In this manner, the lift systems can be raised hydraulically and mechanically latched in the raised position for transportation of the bins; and for unloading mechanically unlatched and hydraulically lowered.

While the invention has been described and illustrated in detail, it is to be clearly understood that this is by way of illustration and example only and is not to be taken by way of limitation, the spirit and scope of the invention being limited only by the terms of the following claims.

I claim:

1. A bin transporter system for use in lifting a plurality of bins onto a vehicle for transportation and subsequent unloading from said vehicle comprising:

a main frame mounted on said vehicle, a plurality of lift systems mounted on said frame, each of said lift systems comprising:

a cross bar, lift arm means mounted on said cross bar, a pair of support bars mounted on said main frame in spaced apart relationship, a support frame slidably supported on each of said support bars, a bracket connected between said support frames, said cross bar being supported between said support frames, drive means for driving said support frames slidably along said support bars to lift said lift arm means upwardly to a predetermined raised position and to lower said lift arm means downwardly to a predetermined lowered position, means for mechanically latching said bracket to retain the lift arm means in the predetermined raised position comprising a latching arm pivotally supported on said main frame, said latching arm having an elongated notch formed therein, the bracket being retained in said notch when the lift arm means is in the raised position, said latching arm further having a cam surface, and spring means for urging said latching arm against said bracket, and means for withdrawing said latching arm from engagement with said notch comprising a handle and means for coupling said handle to the latching arm, whereby as the lift arm means approaches the predetermined raised position, the bracket rides along the latching arm cam surface and is finally driven into latching engagement with said notch by said spring means and when said handle is actuated, the latching arm is withdrawn from said bracket against the action of said spring means to unlatch the bracket.

2. The system of claim 1 wherein said lift arm means comprises a pair of lift arms in spaced apart relationship, the spacing between said lift arms being adjustable.

3. The system of claim 1 wherein said drive means comprises a pair of hydraulic cylinders mounted on said main frame and having their drive rods connected to said bracket.

* * * * *